US011100464B1

(12) United States Patent
Lefkow et al.

(10) Patent No.: US 11,100,464 B1
(45) Date of Patent: *Aug. 24, 2021

(54) PREDICTIVE CONSOLIDATION SYSTEM BASED ON SENSOR DATA

(71) Applicant: Amazon Technologies, Inc., Seattle, WA (US)

(72) Inventors: Dave Jonathan Lefkow, Bellevue, WA (US); Samuel Stevens Heyworth, Seattle, WA (US); Amirali Virani, Bellevue, WA (US); Hannah McClellan Richards, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/530,562

(22) Filed: Aug. 2, 2019

Related U.S. Application Data

(63) Continuation of application No. 15/927,998, filed on Mar. 21, 2018, now Pat. No. 10,373,118.

(51) Int. Cl.
*G06Q 10/08* (2012.01)

(52) U.S. Cl.
CPC ..... *G06Q 10/0875* (2013.01); *G06Q 10/0838* (2013.01)

(58) Field of Classification Search
CPC .................. G06Q 10/087; G06Q 10/0875
See application file for complete search history.

(56) References Cited

U.S. PATENT DOCUMENTS

| 5,168,445 A | 12/1992 | Kawashima et al. |
| 5,235,509 A | 8/1993 | Mueller et al. |

(Continued)

FOREIGN PATENT DOCUMENTS

| WO | 2016149674 | 9/2016 |
| WO | 2017118845 | 7/2017 |

OTHER PUBLICATIONS

"Amazon Dash Replacement for Developers", Youtube, Available Online at: https://www.youtube.com/watch?v=WS42WcuSyVU, Jan. 30, 2017, 4 pages.

(Continued)

*Primary Examiner* — Allen C Chein
*Assistant Examiner* — Denisse Y Ortiz Roman
(74) *Attorney, Agent, or Firm* — Kilpatrick Townsend & Stockton LLP

(57) ABSTRACT

Techniques for consolidation of items based on sensor data is provided. For example, an amount of an item may be identified using an electronic sensor associated with an automatic replenishment device. When the amount of the item is greater than a first reorder threshold, the item may not be ordered on behalf of the user until the amount of the item reaches the first reorder threshold. However, when an order for a different item is placed, either by accessing a network document to proactively order the different item or through a reorder schedule based on a consumption rate of the different item, the amount of the first item may be compared with a second reorder threshold. When the amount of the first item is less than the second reorder threshold, a notification may be provided to the user for additionally ordering the second item with the first item.

22 Claims, 8 Drawing Sheets

(56) References Cited

U.S. PATENT DOCUMENTS

| | | | |
|---|---|---|---|
| 6,204,763 | B1 | 3/2001 | Sone |
| 6,799,085 | B1 * | 9/2004 | Crisp, III ............. B67D 1/0057 222/146.6 |
| 7,542,866 | B1 | 6/2009 | Lovegren et al. |
| 8,005,761 | B1 | 8/2011 | Braumoeller et al. |
| 8,260,672 | B2 | 9/2012 | Weel et al. |
| 8,718,620 | B2 | 5/2014 | Rosenblatt |
| 9,267,834 | B2 | 2/2016 | Chowdhary et al. |
| 9,619,831 | B1 | 4/2017 | Kumar et al. |
| 10,360,617 | B2 | 7/2019 | High et al. |
| 10,373,118 | B1 | 8/2019 | Lefkow et al. |
| 10,438,276 | B2 | 10/2019 | Godsey et al. |
| 10,445,672 | B2 | 10/2019 | Renfroe |
| 10,445,819 | B2 | 10/2019 | Renfroe |
| 10,474,987 | B2 | 11/2019 | Corona et al. |
| 2006/0206373 | A1 | 9/2006 | Blair et al. |
| 2007/0162326 | A1 | 7/2007 | Weel et al. |
| 2008/0113614 | A1 | 5/2008 | Rosenblatt |
| 2010/0076903 | A1 | 3/2010 | Klingenberg et al. |
| 2011/0153466 | A1 | 6/2011 | Harish et al. |
| 2012/0038456 | A1 | 2/2012 | Pikkarainen et al. |
| 2013/0038455 | A1 | 2/2013 | Chowdhary et al. |
| 2013/0231877 | A1 | 9/2013 | Weber et al. |
| 2013/0300595 | A1 | 11/2013 | Hemmendorff |
| 2014/0095479 | A1 | 4/2014 | Chang et al. |
| 2014/0203040 | A1 | 7/2014 | Clark et al. |
| 2015/0142621 | A1 | 5/2015 | Gray et al. |
| 2015/0178654 | A1 | 6/2015 | Glasgow et al. |
| 2015/0186836 | A1 | 7/2015 | Chouhan et al. |
| 2015/0278912 | A1 | 10/2015 | Melcher et al. |
| 2015/0302510 | A1 | 10/2015 | Godsey et al. |
| 2015/0329260 | A1 | 11/2015 | Singh |
| 2016/0019780 | A1 | 1/2016 | Gettings et al. |
| 2016/0040580 | A1 | 2/2016 | Khaled et al. |
| 2016/0132821 | A1 | 5/2016 | Glasgow et al. |
| 2016/0134930 | A1 | 5/2016 | Swafford |
| 2016/0180239 | A1 | 6/2016 | Frankel et al. |
| 2016/0203431 | A1 | 7/2016 | Renfroe |
| 2016/0229678 | A1 | 8/2016 | Difatta et al. |
| 2016/0314514 | A1 | 10/2016 | High et al. |
| 2016/0347540 | A1 | 12/2016 | Skocypec et al. |
| 2017/0070523 | A1 | 3/2017 | Bailey et al. |
| 2017/0201057 | A1 | 7/2017 | Ahlawat et al. |
| 2017/0300984 | A1 | 10/2017 | Hurwich |
| 2018/0053140 | A1 | 2/2018 | Baca et al. |
| 2018/0164143 | A1 | 6/2018 | Gurumohan et al. |
| 2018/0165627 | A1 | 6/2018 | Jones et al. |
| 2018/0260779 | A1 | 9/2018 | Singh et al. |
| 2018/0308514 | A1 | 10/2018 | Li et al. |
| 2019/0108483 | A1 | 4/2019 | Tineo |
| 2020/0105409 | A1 | 4/2020 | Kochar et al. |

OTHER PUBLICATIONS

Li et al., "Discussion of Principle and Application for Internet of Things", Applied Mechanics and Materials, vol. 347-350, 2013, pp. 3322-3325.

Welch et al., "Seven Keys to ERP Success", Strategic Finance, vol. 89, No. 3, Institute of Management Accountants, Sep. 2007, pp. 41-61.

"Amazon Dash Replenishment", XP054979477, Available online at: https://www.youtube.com/watch?v=vTYcWG6BIDY, Jan. 19, 2016, 3 pages.

"Amazon Dash Replenishment for Developers", XP054979476, Available online at: https://www.youtube.com/watch?v=WS42WcuSyVU, Jan. 30, 2017, 5 pages.

"Dash Replenishment Service CX Guidelines", Dash Replenishment Service, XP055598411, Available online at: https://web.archive.org/web/20171208012109/https://developer.amazon.com/docs/dash/customer-experience-guidelines.html, Dec. 8, 2017, 9 pages.

"Dash Replenishment Service Glossary", Dash Replenishment Service, XP055598456, Available online at: https://web.archive.org/web/20171208041422/https://developer.amazon.com/docs/dash/glossary.html, Dec. 8, 2017, 6 pages.

"Frequently Asked Questions", Dash Replenishment Service, XP055598417, Available online at: https://web.archive.org/web/2017120801 2934/https://developer.amazon.com/docs/das h/faqs.html, Dec. 8, 2017, 5 pages.

"GetOrderInfo Endpoint", Dash Replenishment Service, XP055598458, Available online at: https://web.archive.org/web/2017120804 1609/https://developer.amazon.com/docs/dash/getorderinfo-endpoint.html, Dec. 8, 2017, 6 pages.

"Notification Messages (DRS)", Dash Replenishment Service, XP055598457, Available online at: https://web.archive.org/web/20171208041525/https://developer.amazon.Gom/docs/dash/notification-messages.html, Dec. 8, 2017, 14 pages.

"SlotStatus Endpoint", Dash Replenishment Service, XP055598461, Available online at: https://web.archive.org/web/20171208041548/https://developer.amazon.com/docs/dash/slotstatus-endpoint.html, Dec. 8, 2017, 7 pages.

U.S. Appl. No. 15/696,040, "Sensor Data-Based Reordering of Items", filed Sep. 5, 2017.

U.S. Appl. No. 15/918,205, "Managing Shipments Based on Data From a Sensor-Based Automatic Replenishment Device", filed Mar. 12, 2018.

U.S. Appl. No. 15/926,779, "Product Specific Correction For a Sensor-Based Device", filed Mar. 20, 2018.

U.S. Appl. No. 15/927,324, "Managing Electronic Requests Associated With Items Stored by Automatic Replenishment Devices", filed Mar. 21, 2018.

U.S. Appl. No. 15/927,946, "Automatic Replenishment of Items Utilizing a Sensor-Based Device", filed Mar. 21, 2018.

U.S. Appl. No. 15/927,990, "Order Quantity and Product Recommendations Based on Sensor Data", filed Mar. 21, 2018.

U.S. Appl. No. 15/927,998 , "Non-Final Office Action", dated Oct. 2, 2018, 27 pages.

U.S. Appl. No. 15/927,998 , "Notice of Allowance", dated Mar. 27, 2019, 7 pages.

U.S. Appl. No. 15/927,998, "Predictive Consolidation System Based on Sensor Data", filed Mar. 21, 2018.

U.S. Appl. No. 15/928,370, "Product and Lid Identification for Sensor-Based Device", filed Mar. 22, 2018.

U.S. Appl. No. 15/928,409, "LED Enhanced Product and Lid Identification for Sensor-Based Device", filed Mar. 22, 2018.

U.S. Appl. No. 15/934,780, "Test-Enabled Measurements for a Sensor-Based Device", filed Mar. 23, 2018.

U.S. Appl. No. 15/963,761, "Sensor-Related Improvements to Automatic Replenishment Devices", filed Apr. 26, 2018.

Griffiths , "Never Run Out of Food Again! Smart Mat Warns You When You're Low on Milk While Fridge Cam Lets you Remotely Check What you Already Have During your Weekly Shop", Available online at http://www.dailymail.co.uk/sciencetech/article-3385278/Never-run-food-Smart-mat-tells-low-milk-fridge-cam-shows-s-inside-shopping.html, Jan. 5, 2016, 8 pages.

PCT/US2019/022215 , "International Search Report and Written Opinion", dated Apr. 29, 2019, 11 pages.

PCT/US2019/022226 , "International Search Report and Written Opinion", dated Jul. 2, 2019, 14 pages.

* cited by examiner

PREDICTIVE CONSOLIDATION SYSTEM BASED ON SENSOR DATA

CROSS-REFERENCE TO RELATED APPLICATIONS

This application is a continuation of U.S. patent application Ser. No. 15/927,998, filed Mar. 21, 2018, and issued as U.S. Pat. No. 10,373,118 on Aug. 6, 2019, entitled "PREDICTIVE CONSOLIDATION SYSTEM BASED ON SENSOR DATA," which is incorporated herein by reference in its entirety.

BACKGROUND

Computer-based interface interactions can be time consuming and confusing. For example, when the interactions involve ordering an item, the user may place an order for a single item without considering other items that the user also needs to order. The user may return to the user interface to place additional orders, which may have been easily consolidated, had the order for the items been placed at the same time. Some conventional systems may solve this issue by enabling electronic reminders for placing orders. However, many of these electronic reminders merely rely on the user to identify these electronic reminders at predetermined periodic intervals.

BRIEF DESCRIPTION OF THE DRAWINGS

Various embodiments in accordance with the present disclosure will be described with reference to the drawings, in which.

DETAILED DESCRIPTION

Figure 1:
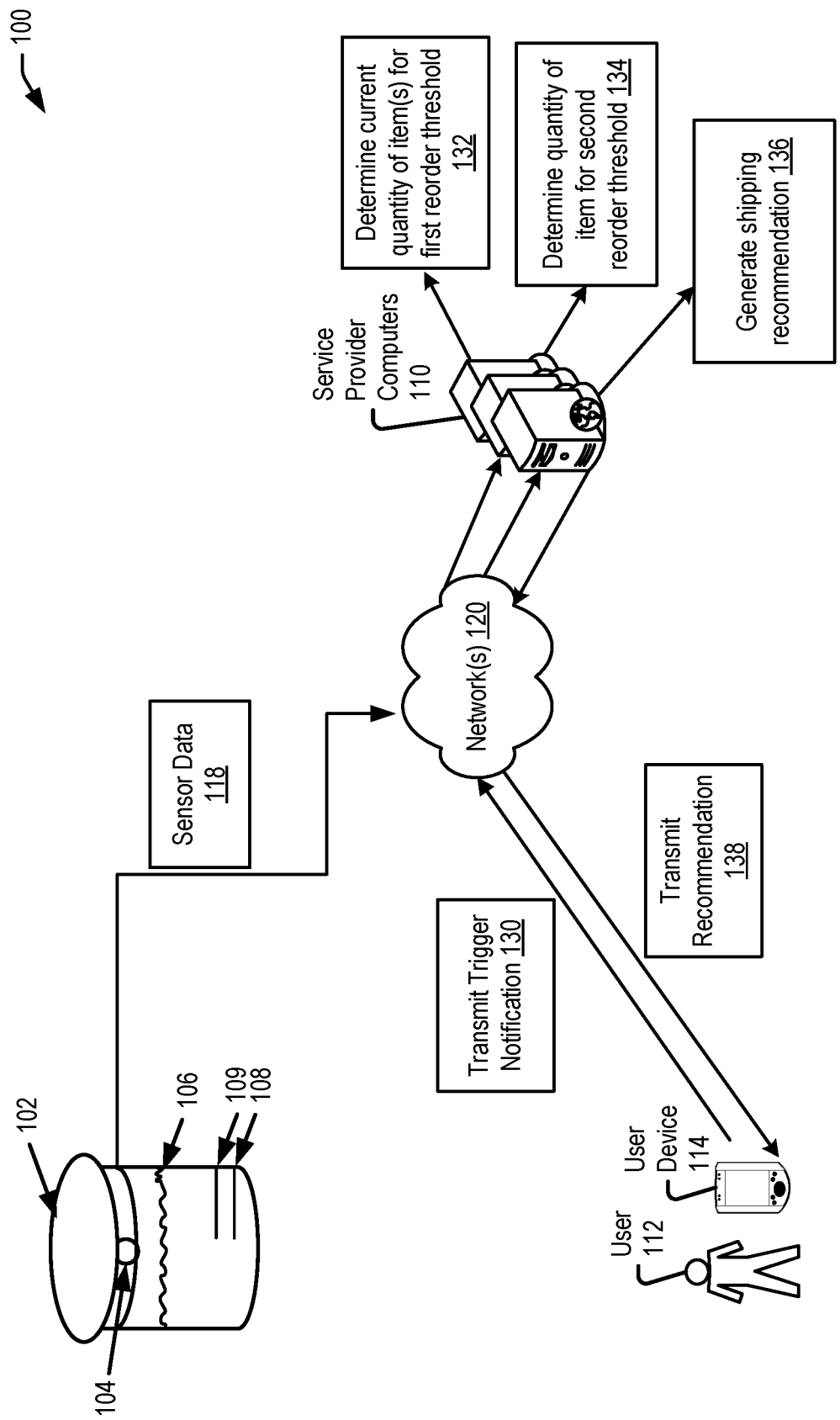
FIG. 1 illustrates a workflow for predictive consolidation of items based on sensor data, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide consolidation of items based on sensor data. For example, a service provider computer may maintain a user profile for a user that indicates an amount of an item that is ordered on behalf of the user. The amount of the item may be identified using an electronic sensor associated with an automatic replenishment device (ARD) that indicates the current amount of the first item remaining with the ARD. When the current amount of the item is greater than a first reorder threshold, the item may not be ordered on behalf of the user (or the ARD) until the amount of the item reaches the first reorder threshold. However, when an order for a different item is placed, either by accessing a network document to proactively order the different item or through a reorder schedule of the different item, the current amount of the first item may be compared with a second reorder threshold. When the current amount of the first item is less than the second reorder threshold, a notification may be provided to the user for additionally ordering the second item with the first item.

The sensor-enabled device may include a pad, mat, or shelf in which items (e.g., office supplies, toiletries, dog food, or consumable items generally) are placed on a surface of the automatic replenishment device, or a container in which the items are placed within the container. The automatic replenishment device may comprise one or more sensors to configured to periodically obtain weight measurements or property measurements of the automatic replenishment device corresponding with weight or number of items stored in the automatic replenishment device. The measurements may generate sensor data. The number of items may decrease over time and may indicate that a user is removing the items from the automatic replenishment device and using/consuming the items. The sensor data obtained by the sensor(s) may be transmitted via an available network (e.g., the Internet) such as a Wi-Fi network or cellular network to one or more service provider computers that analyze the sensor data and determine a current amount or consumption rate of the item.

In some examples, the service provider computer may determine a first reorder threshold associated with one or more item in the possession of the user. The first reorder threshold may be based on the item itself (e.g., expiration dates), consumption patterns of the user (e.g., based on the sensor(s) of the automatic replenishment device), or specified by the user. The service provider computer may utilize the sensor data and first reorder threshold to automatically reorder the item for delivery. For example, when the sensor data obtained by the sensor(s) of the automatic replenishment device is equal to or below the first reorder threshold, the item may be ordered and delivered to a user. By utilizing the sensor data in this fashion, the system can dynamically adjust the automatic reorder of the item resulting in the user receiving additional inventory of the item prior to the user's supply of the item being depleted.

In some examples, the service provider computer may also determine a second reorder threshold associated with an item. For example, the second reorder threshold may correspond with a predetermined value greater than the first reorder threshold. When the item fails to exceed the first reorder threshold, a trigger notification may initiate a comparison between the amount of the item and the second reorder threshold. When the item exceeds the second reorder threshold, but not the first reorder threshold, additional actions associated with the item may be performed, including providing a notification to the user. The notification may include, for example, an offer to combine multiple items in a single order for shipment (e.g., to help save on shipping costs).

The processes and systems described herein may be an improvement on conventional reordering systems. For example, conventional reordering or subscription services fail to dynamically adjust a reorder of an item based on the usage pattern of the item, which may fluctuate according to various circumstances around a user consuming an item. Additionally, some items may be close to a reorder threshold without meeting it. The user may benefit from reordering item when the user places an order for a different item, especially when the likelihood of receiving an order for the different item is within a predetermined time range. This may be triggered when the user is placing an order for one of the items and the other item is about to be reordered. The improved system may facilitate combining a shipment of multiple items to increase efficiency and cost. The methods and systems described herein also provide for more efficient and automatic reordering of items on behalf of the user by utilizing the sensor data obtained by the sensor-enabled automatic replenishment device (ARD).

Additionally, many technological improvements over existing systems are possible. In an example, better integration between the ARD and the back-end system may be achieved. In particular, much of the processing may be offloaded from the ARD to the computer system of the back-end system. It may be sufficient for the ARD to send its raw sensor data and an identifier of the ARD. The processing of this data, computation of a consumption rate, and maintenance of a user profile may be performed by the computer system. This may translate into processing savings on the ARD, thereby allowing the ARD to lower its power consumption.

Furthermore, the processing of the sensor data and maintenance of the user profile may allow additional optimization of services available from the back-end system. In particular, generating a consumption rate and monitoring its slope (e.g., how fast or slow the consumption is) may represent new data not available in existing systems that involve ARDs. This new data may be used to optimize the allocation and management of the delivery resources. In the existing systems, in the case of a user-based purchase, existing systems would ship the items separately, which means that two different sets of resources are allocated, one per item for the separate deliveries. In contrast, by combining the deliveries, resources are saved. A single set of resources (collectively smaller than the two sets of the prior systems) would be used.

FIG. 1 illustrates a workflow for a predictive consolidation of items based on sensor data, in accordance with at least one embodiment. In illustration 100, a sensor-enabled, automatic replenishment device 102 includes a sensor 104 that is configured to determine an amount of item 106 associated with the automatic replenishment device 102. For example, the item 106 may be placed in the automatic replenishment device 102 when the device is a container or the item 106 may be placed on the automatic replenishment device 102 when the device is a shelf or platform.

The automatic replenishment device 102 may also correspond with a first reorder threshold 108. The first reorder threshold 108 may correspond with an amount of item 106 that triggers an automatic order for the item stored with the automatic replenishment device 102. The order may be initiated by a service provider computer 110. For example, the user 112 may identify an amount of items with the automatic replenishment device 102 and when the automatic replenishment device 102 identifies, via sensor data, that the amount of item has reached the amount identified by the user corresponding with a first reorder threshold 108, the order may be initiated on behalf of the user.

The automatic replenishment device 102 may also correspond with a second reorder threshold 109. The second reorder threshold 109 may correspond with an amount of item 106 that does not alone trigger an order for the item stored with the automatic replenishment device 102. Instead, an order for the item that meets or exceeds the second reorder threshold 109 may be initiated when a trigger notification is received by the service provider computer 110.

Various reorder thresholds may be determined. For example, the first reorder threshold 108 and the second reorder threshold 109 are illustrated in FIG. 1. In this example, the first reorder threshold 108 may correspond with less of an amount of an item than the second reorder threshold 109.

In some examples, the second reorder threshold may be calculated based at least in part on the first reorder threshold. For example, the first reorder threshold may be a first value and the second reorder threshold may be a second value that is within a range of values greater than the first reorder threshold. As a sample illustration, the range of values for the second reorder threshold may comprise ten to twenty percent while the first reorder threshold is five percent. When the first reorder threshold increases in this example, the second reorder threshold may also increase (e.g., by the same relative amount as the incremented first reorder threshold, or by a predetermined percentage increase, etc.).

The range of values for the second reorder threshold may be dynamic as well. For example, the second reorder threshold may correspond with historical deliveries of a replacement amount for a first item. As the number of historical deliveries for the first item increases, the second reorder threshold may increase as well. This may help consolidate shipments of the second item corresponding with the second reorder threshold, so that the second item may be reordered more frequently with the first item. In some examples, the range of values is defined based at least in part on historical deliveries of the replacement amount of the first item with other items (e.g., other items stored in automatic replenishment devices, other items historically delivered with the first item, etc.).

When the amount of an item fills the container to each of these thresholds, a corresponding action may be taken. For example, when an amount of the item stored by the ARD meets the first reorder threshold 108, the corresponding action may include reordering the item stored by the ARD. The process of reordering the item may include transmitting an order request for a predetermined amount of the first item to a service provider computer associated with electronic marketplace. The amount of the item (e.g., 1 pound, 1 bag, etc.) and the identification of item (e.g., item identifier, etc.) stored by the ARD may be stored with a user profile. The user profile may correlate the item stored in the ARD with any notifications or requests to reorder the item.

When an amount of the item stored by the ARD meets the second reorder threshold 109, the corresponding action may include consolidating the item stored by the ARD with a second item. The determination of whether to consolidate the item stored by the ARD may be initiated by a trigger notification. In some examples, the determination of whether to consolidate the item with a second item may be restricted to receiving the trigger notification and not determined before. Upon receiving the trigger notification and determining the item meets the second reorder threshold 109, the item corresponding with the second reorder threshold may be ordered in the delivery of this item may be consolidated with the item associated with the trigger notification.

As a sample illustration, a first item may be added to the electronic cart to order and a notification may be transmitted to a service provider computer. Upon receiving the notification that identifies that the first item has been added to the electronic cart, the service provider computer may identify the second item is corresponding with the second reorder threshold 109. A notification may be generated that additionally orders an amount of the second item for delivery with the first item in the electronic cart.

In some examples, the trigger notification may comprise an order of a different item via an network document. For example, the order may correspond with an item that is unrelated to the automatic replenishment device 102. In other examples, the trigger notification may comprise an automatic reorder of an item that is identified by the service provider computer 110, that may still be different than the item in the automatic replenishment device 102. In either instance, the trigger notification may be received prior to determining whether the amount of items 106 has met the second reorder threshold 109, but not the first reorder threshold 108.

The amount of items 106 may be determined based at least in part on sensor data of 118. The automatic replenishment device 102 may transmit sensor data 118 via a network 120 a service provider computer 110. In some examples, the automatic replenishment device 102 is configured to periodically transmit the sensor data to the service provider computer 110.

The automatic replenishment device 102 may correspond with a user 112 operating a user device 114. The automatic replenishment device 102, user 112, and user device 114 may correspond with a user profile that is maintained by a service provider computer 110. For example, the user profile may identify one or more items that the user has ordered in association with the service provider computer 110. The user profile may also include an amount of item 106 corresponding with a periodic measurement of the amount of the item associated with the automatic replenishment device 102.

In some examples, a user may be notified of a reorder recommendation or automatic reorder for an item based on the amount of item 106. The reorder for the item may be initiated when the amount of the item meets or exceeds the first reorder threshold 108. In some examples, the reorder of the item may be instructed for delivery upon a consent of the user. This may include the user 112 interacting, via a corresponding user device 114, with the notification to process the reorder.

The user profile may also comprise a history of sensor data corresponding with a periodic measurement of the amount of item associated with the automatic replenishment device 102. For example, the periodic measurement of the amount of item may be stored with user profile to generate the history of the sensor data.

In accordance with illustration 100, at 130, the user 112 may operate the user device 114 to transmit a trigger notification via the network 120 to the service provider computer 110. The trigger notification, in this illustration, may correspond with the user accessing a network document to order a first item. The first item may be offered by an item provider through an electronic marketplace provided by the service provider computer 110. The user 112 may access the electronic marketplace, search for the first item, and add the first item to electronic cart associated with the user profile. Upon initiating an order for the first item (e.g., by adding the item to the electronic cart, etc.), the trigger notification may be generated and received at the service provider computer 110.

At 132, the service provider computer 110 may identify a user profile associated with the user 112 and determine an amount of a second item. The amount of the item may correspond with the sensor data 118 that has been transmitted by automatic replenishment device 102 to the service provider computer 110. The second item, in some examples, may be different than the first item associated with the trigger notification.

The sensor data 118 may be compared with a first reorder threshold. The first reorder threshold may be stored with the user profile associated with the user 112. When the amount of item is equal to or less than the first reorder threshold, the reorder for the item may be initiated. However, when the current amount of the item is greater than the first reorder threshold, the item may not be ordered on behalf of the user based on the first reorder threshold alone.

The sensor data 118 may also be compared with a second reorder threshold upon receiving the trigger notification. In some examples, the second reorder threshold may correspond with a greater amount of items then the first reorder threshold. In some examples, updated sensor data may be received upon receiving the trigger notification by transmitting a request to the automatic replenishment device 102 and receiving the sensor data in response.

At 134, an updated amount of the item stored with the automatic replenishment device 102 may be determined. In some examples, the updated amount of item may be identified upon receiving the trigger notification. This may include, for example, electronically requesting an updated amount of the item stored with the automatic replenishment device 102 from the automatic replenishment device 102 via networks 120.

When the trigger notification is received, the first item associated with the trigger notification and the second item associated with the automatic replenishment device 102 may be identified. The service provider computer 110 may determine a corresponding package for each item (e.g., stored in a data store) and determine an opportunity to ship the first item associated with the trigger notification and a second item associated with the automatic replenishment device 102 within the same package.

For example, the data store may identify a plurality of dimensions for available packages that may ship items. The dimensions corresponding with the first item and the dimensions corresponding with the second item may also be determined. An aggregation of the dimensions of the first and second items may be compared with one or more available package dimensions to determine whether the first and second items are available to ship together in one available package. When an available package is identified, a shipping recommendation may be generated that identifies that the first and second items may be combined in a single package. In some examples, when no available packages meet the restrictions associated with the dimensions of the first and second items, a shipping recommendation to combine the first and second items in a single package may not be transmitted.

At 136, a shipping recommendation may be transmitted. For example, a recommendation to order the first item and the second item together may be included with a notification and transmitted, via networks 120, to user device 114 that is associated with user 112. In some examples, the recommendation 128 may be transmitted as an electronic communication, a user interface object for a mobile application or a native application of user device 114, a data object for a web browser of user device 114, an email, or a short message service (SMS) text message. The user 112 may interact with user device 114 to consent or confirm the update of the amount of the item associated with automatic replenishment device 102. According to user preferences of user 112 that are maintained in the user profile, the combination of the first and second items in a single package may be ordered without confirmation or interaction by the user 112 via user device 114.

Figure 2:
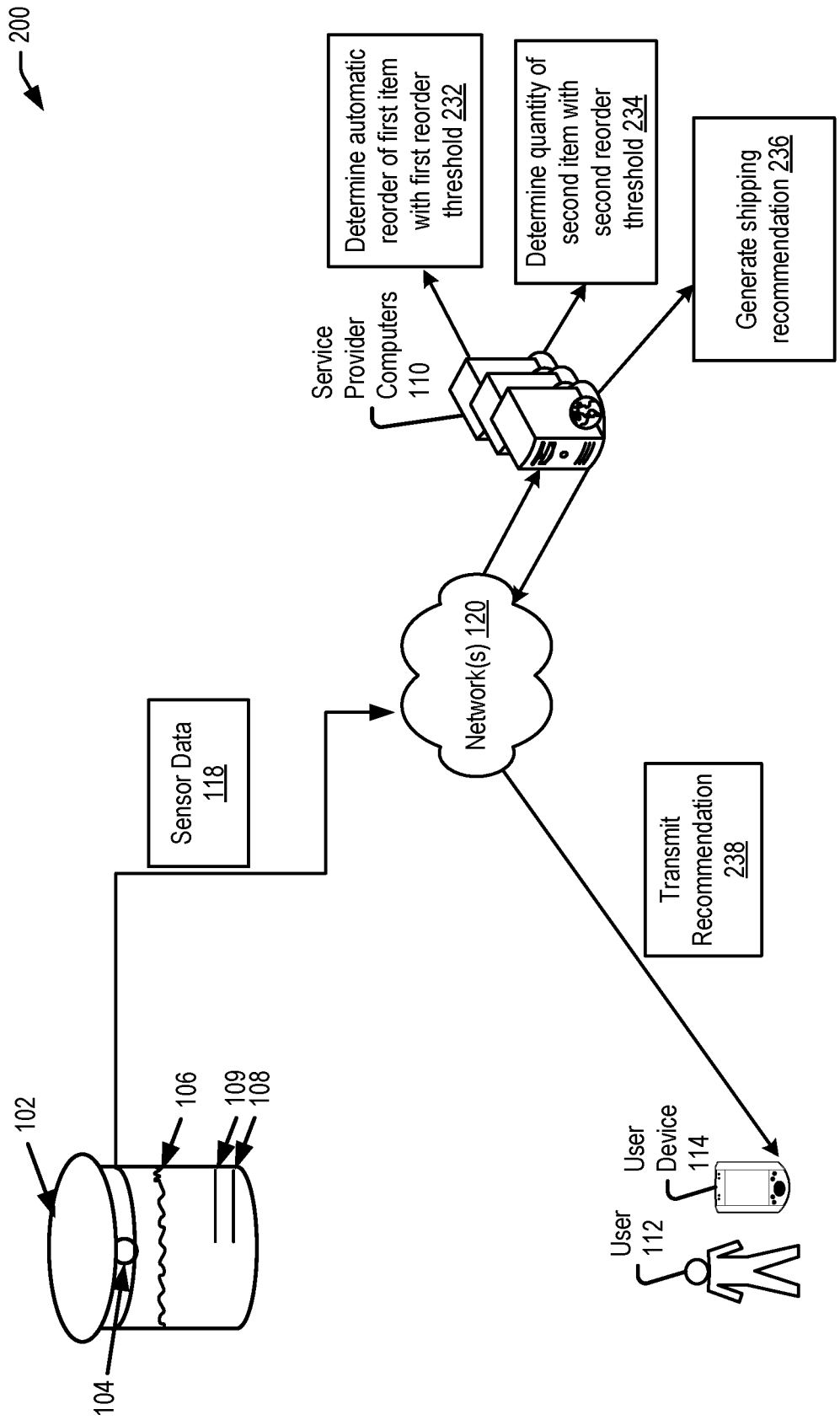
FIG. 2 illustrates a workflow for predictive consolidation of items based on sensor data, in accordance with at least one embodiment.

FIG. 2 illustrates a workflow for predictive consolidation of items based on sensor data, in accordance with at least one embodiment. In accordance with illustration 200, the process may begin when an automatic reorder of the first item is initiated. For example, an amount of the first item may be stored in automatic replenishment device 102 and received as sensor data 118 by the service provider computer 110. The amount of the first item may be equal to or less than the first reorder threshold 108, which may trigger an automatic reorder process. The automatically order process may initiate an order for the first item offered by an item provider through an electronic marketplace provided by the service provider computer 110. In some examples, no trigger notification is sent via network 120 between the service provider computer 110 and user device 114, but rather the trigger notification may be received when the automatic reorder process is initiated with the service provider computer 110.

At 232, the service provider computer 110 may identify a user profile associated with user 112 corresponding with the automatic reorder process. The amount of the item may correspond with the sensor data 118 that has been transmitted by automatic replenishment device 102 to the service provider computer 110. The second item, in some examples, may be different than the first item associated with the trigger notification.

At 234, the sensor data 118 may be compared with a second reorder threshold upon receiving the trigger notification. In some examples, the second reorder threshold may correspond with a greater amount of items then the first reorder threshold. In some examples, updated sensor data may be received upon receiving the trigger notification by transmitting a request to the automatic replenishment device 102 and receiving the sensor data in response.

At 236, a shipping recommendation may be transmitted. For example, a recommendation to order the first item and the second item together may be included with a notification and transmitted, via networks 120, to user device 114 that is associated with user 112. In some examples, the recommendation 128 may be transmitted as an electronic communication, a user interface object for a mobile application or a native application of user device 114, a data object for a web browser of user device 114, an email, or a short message service (SMS) text message. The user 112 may interact with user device 114 to consent or confirm the update of the amount of the item associated with automatic replenishment device 102. According to user preferences of user 112 that are maintained in the user profile, the combination of the first and second items in a single package may be ordered without confirmation or interaction by the user 112 via user device 114.

Figure 3:
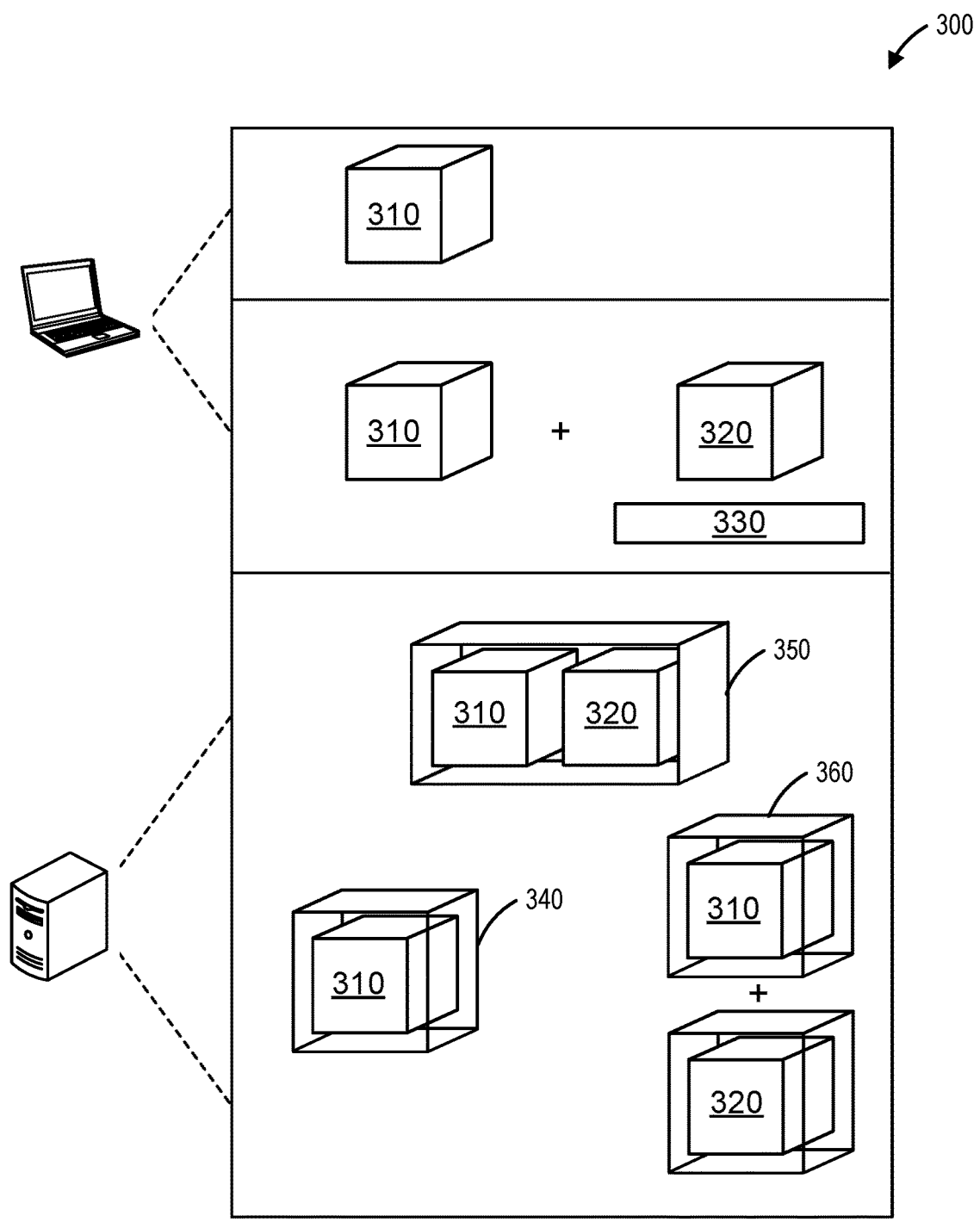
FIG. 3 illustrates an example flow for consolidating an order and shipment of items, in accordance with at least one embodiment.

FIG. 3 illustrates an example flow for consolidating an order and shipment of items, in accordance with at least one embodiment. In illustration 300, a first item 310 and a second item 320 are provided. In this illustration, the first item 310 is associated with a trigger notification and the second item 320 is associated with an automatic replenishment device (ARD) 330.

The notification transmitted to the user device can comprise one or more delivery options illustrated in FIG. 3. The delivery options for the first item 310 in the second item 320 may comprise delivering the first item 310 in a single package to a user 340, delivering the first item 310 and the second item 320 in a single package to the user 350, or delivering the first item 310 in a first package and the second item 320 in second package to the user 360.

A shipment consolidation of the first item and the second item in a single package may be determined upon a response received from a user device. For example, the shipment consolidation may be determined when the user instructs the consolidation to proceed (e.g., "yes, please send me both items in the same package," etc.). In some examples, the shipment consolidation may be determined automatically, based on a shipment consolidation option in a user profile and receiving the trigger notification.

Figure 4:
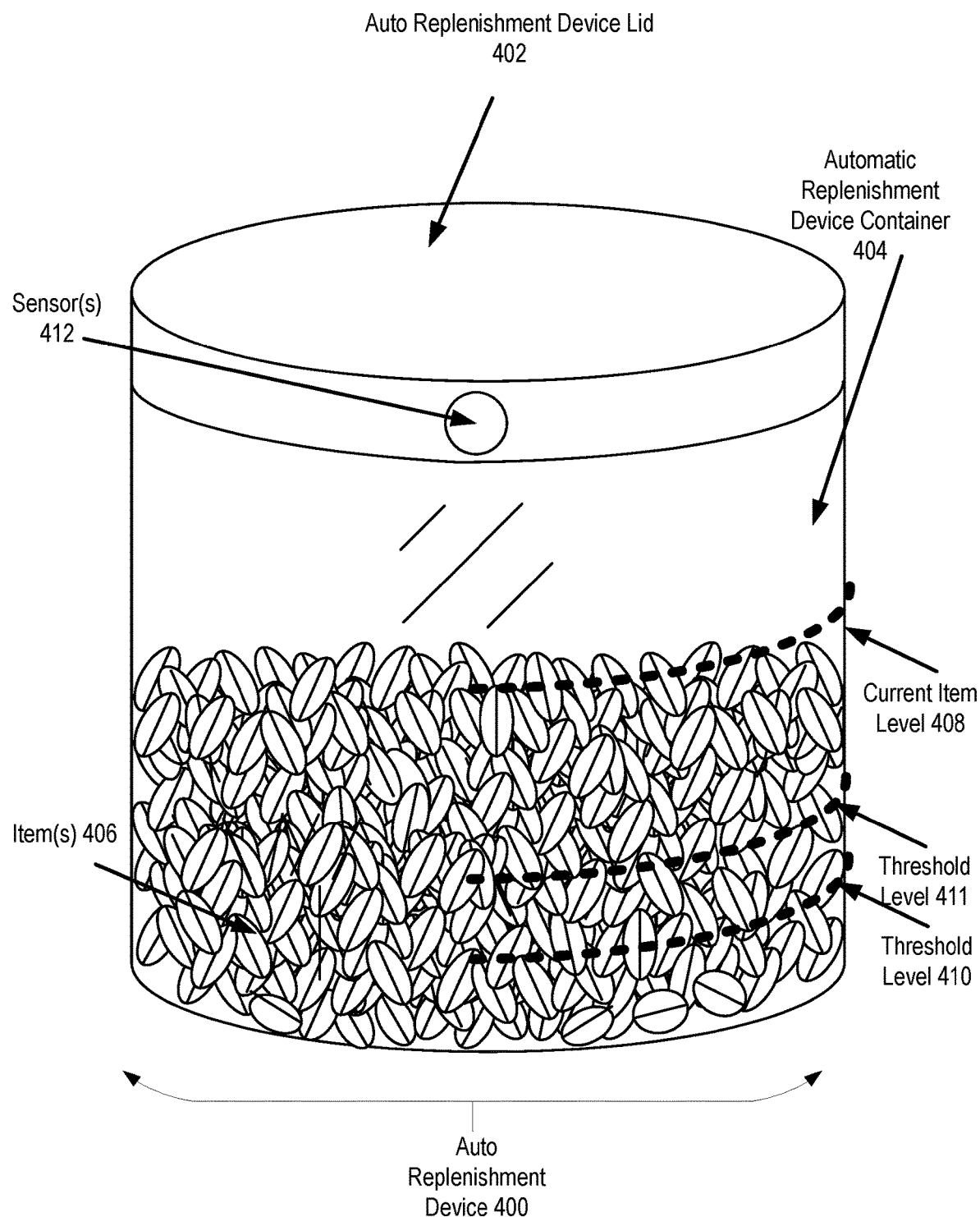
FIG. 4 illustrates an example ARD with items placed within the ARD, in accordance with at least one embodiment.

FIG. 4 illustrates an example automatic replenishment device (ARD) with items placed within the ARD, in accordance with at least one embodiment. The ARD 400 is an example of the ARD 102 of FIG. 1 and may include an ARD lid 402 and an ARD container 404. One or more item(s) 406 (e.g., coffee beans) may be stored within the ARD container 404. FIG. 4 also includes visual representations for a current level 408 of the item(s) 406 and a threshold level 410. It should be noted that although the ARD 400 of FIG. 4 includes visual representations of a current level 408 of item and a threshold level 410, these depictions are for clarification of aspects of the embodiments described herein. For example, a current level 408 of item may be determined by service provider computer(s) 110 of FIG. 1 based on sensor data obtained by sensor(s) 412 and maintained in a user profile that is generated and stored by the service provider computer(s) 110. As described herein, the current level 408 may be determined by monitoring the consumption rate that is derived from the sensor data obtained by the sensor(s) 412. The ARD container 404 may correspond with a first threshold level 410 and a second threshold level 411. The items may be stored in ARD container 404 and associated with the user profile maintained by the service provider computer(s) 110. The first threshold level 410 and second threshold level 411 may be defined for the item(s) 406 based on the type or category of the items or by the user.

It should be noted that the ARD 400 of FIG. 4 represents a container which may be of any shape, depth, or size, in which item(s) 406 are placed within. In embodiments, the ARD 400 may include one or more sensor(s) 412 that may be configured to determine a distance of the item(s) 406 that are currently situated within the ARD container 404 of the ARD 400 (i.e., capture or obtain distance measurements between the one or more sensor(s) 412 and the item(s) 406). The sensor(s) 412 may include a time of flight sensor (e.g., a time of flight camera, a time of flight transmitter and receiver combination, etc.) that is configured to determine/detect a distance/amount of item(s) 406 placed in the ARD container 404 of the ARD 400 based at least in part on the time of flight for a signal to be emitted from the one or more sensor(s) 412 to a current level 408 of the item(s) 406 or to a surface area of the item(s) 406. In accordance with at least one embodiment, the sensor data collected by the one or more sensor(s) 412 may include distance measurements identifying a distance between the item(s) 406 and one or more sensor(s) 412. The sensor data may include the raw data that was obtained by the sensor(s) 412 and/or the sensor data may include values that represent a conversion from the raw data to any suitable format and/or unit of measurement.

The sensor data may indicate a current distance, amount, and/or volume of the item(s) 406 situated within the ARD container 404. For example, the sensor data may indicate a current distance (e.g., 140 mm, 5.5 inches, etc.) between the one or more sensor(s) 412 and the item(s) 406. The sensor data may indicate a current volume of the item(s) (e.g., 57.75 cubic inches, 39.23 cubic inches, etc.) and/or an item number or quantity that indicates a number or quantity of the item(s) 406 situated within the ARD container 404 of ARD 400. The ARD 400 and sensor(s) 412 may be configured to utilize any suitable time of flight signal technology between the sensor(s) 412 and the item(s) 406. In embodiments, the sensor data may include or be accompanied with an item ID, an ARD ID, or an item tag ID. Although the ARD 400 of FIG. 4 includes the sensor(s) 412 within or on a surface of the ARD lid 402, the sensor(s) 412 may be placed on one or more interior surfaces of the ARD container 404. In at least one embodiment, the ARD lid 402 may be configured to be placed on any suitable container (including, for instance, a container of another device such as a coffee grinder for grinding the coffee beans).

Time of flight signal technology can include any electronic signal technology that can determine the elapsed time period between a transmission of a signal from a source and a return of the signal, or at least a portion thereof, back to the source. Other configurations such as a signal source and signal detector may also be utilized to determine time of flight and distance between the sensor(s) 412 and item(s) 406 (e.g., current level of item 408) utilizing a source/detector or transmitter/receiver. In embodiments, the service provider computers may be configured to determine a distance from the sensor(s) 412 and item(s) 406 (e.g., current level of item 408) using the sensor data obtained by the sensor(s) 412.

For example, the elapsed time period between the transmission of a signal from a source to detection of the signal (e.g., from the sensor(s) 412), or at least a portion thereof, at a detector or receiver, along with the known speed of the signal (e.g., the speed of light) may be utilized to determine the distance between the source of the signal (e.g., sensor(s) 412) and the item(s) 406. The ARD 400 may be configured to transmit the sensor data obtained by sensor(s) 412 to a remote computing device separate from the ARD 400 (e.g., the service provider computer(s) 110 of FIG. 1, a cloud-based server/service, etc.). In some embodiments, the remote computing device may be configured to utilize the sensor data to calculate the distance between the sensor(s) 412 and the current level of item 408 and correlate the distance to a volume, amount, and/or quantity of the item(s) 406 left in the ARD container 404. The sensor data may be used to determine the consumption data or consumption rate of item(s) 406 and in embodiments reorder the item(s) 406 upon the amount of the item being equal to or less than the threshold level 410. The sensor data may be adjusted or corrected for any sensor drift and/or any inaccuracy of the measurements due to the type of the sensors 412 (e.g., for transmissivity when the item(s) 406 may not have a particular light transmissivity property).

Figure 5:
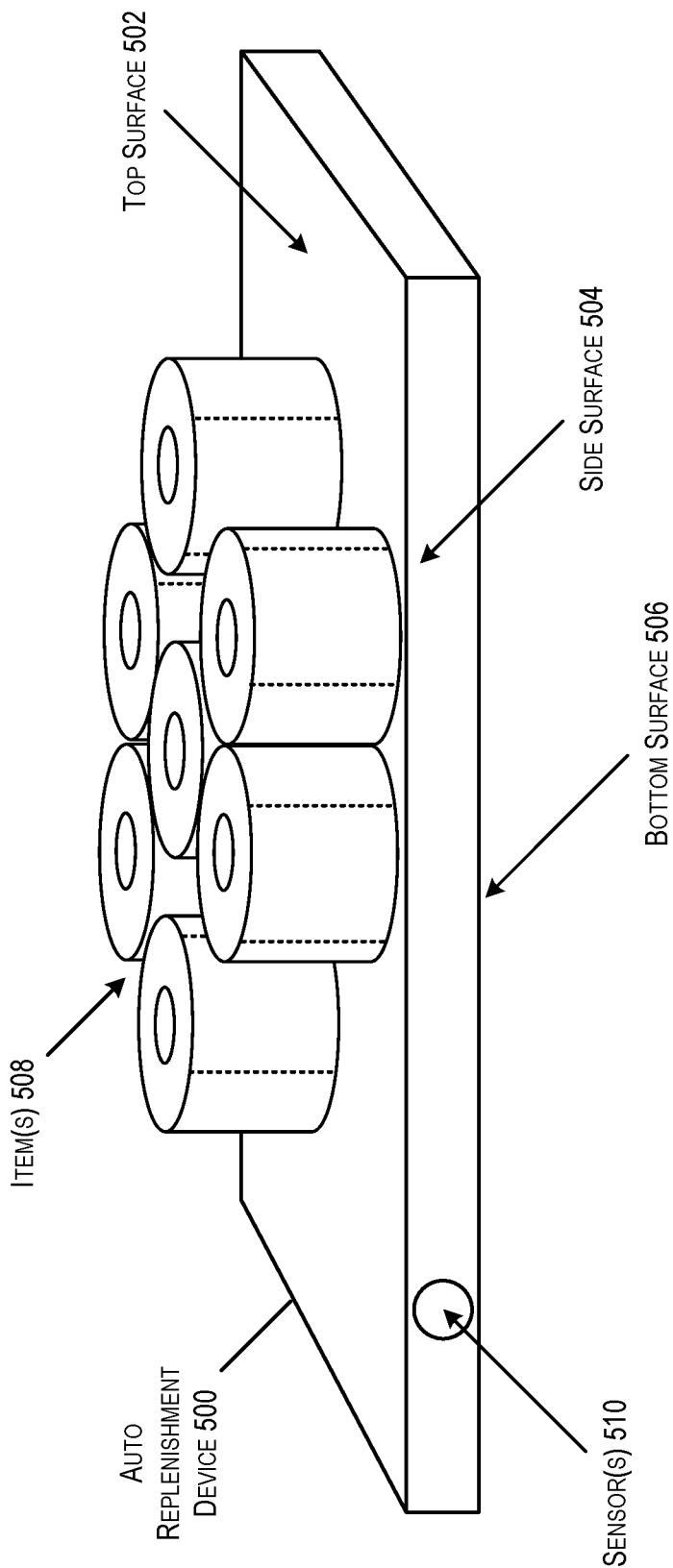
FIG. 5 illustrates an example ARD and items placed on the ARD, in accordance with at least one embodiment.

FIG. 5 illustrates an example ARD and items placed on the ARD, in accordance with at least one embodiment. The ARD 500 may be an example of the ARD 104 from FIG. 1. As illustrated, the ARD 500 which may have a top surface 502, a side surface 504, and a bottom surface 506. One or more items 508 (e.g., toilet paper rolls) may be placed on the top surface 502 of the ARD 500. The bottom surface 506 may be in contact with a flat or substantially flat surface, such as a counter, table, or shelf. It should be noted that although the ARD 500 of FIG. 5 represents a shelf which may be of any shape, depth, or size, the ARD 500 may be a mat or pad in which items 508 are placed thereon. In embodiments, the ARD 500 may include one or more sensor(s) 510. The sensors 510 may be configured to determine a weight of the items 508 that are currently placed on the top surface 502 of the ARD 500 (e.g., capture or obtain weight measurements of the items 508). The sensors 510 may include a weight sensor (e.g., a load sensor, a strain gauge on a load cell, etc.) that is configured to determine/detect a weight/mass of items 508 placed on the top surface 502 of the ARD 500. In accordance with at least one embodiment, the weight of the items 508 (e.g., sensor data, weight measurements, or property measurements) may include the raw data that was obtained by the sensors 510 and ARD 500 that represents a current weight/mass of the items 508 that are situated on the top surface 502 of ARD 500. The weight measurements may indicate a current weight/mass of the items 508, item volume data that indicates a current volume of the items 508, and/or item number/quantity data that indicates a number or quantity of the items 508 situated on the reorder device 500. In embodiments, the sensor data may include or be accompanied with an item ID, an ARD ID, or an item tag ID. Further description of the ARD 500 is available in U.S. patent application Ser. No. 15/696,040 filed Sep. 5, 2017 entitled "SENSOR DATA-BASED REORDERING OF ITEMS" of which the full disclosure is incorporated herein by reference.

As described herein, the ARD 500 may be configured to transmit, via available networks, the weight measurements or other data captured by sensors 510 about items 508 to a service provider computer implementing an automatic replenishment engine. In accordance with at least one embodiment, the weight measurements may be utilized by the service provider computers to determine a consumption rate of a user associated with ARD 500 of the items 508. The consumption rate may be utilized to order a replacement amount of the items 508 (e.g., additional rolls of the toilet paper) and to determine whether to additionally order and deliver the item 508 with a first item associated with a trigger notification.

Figure 6:
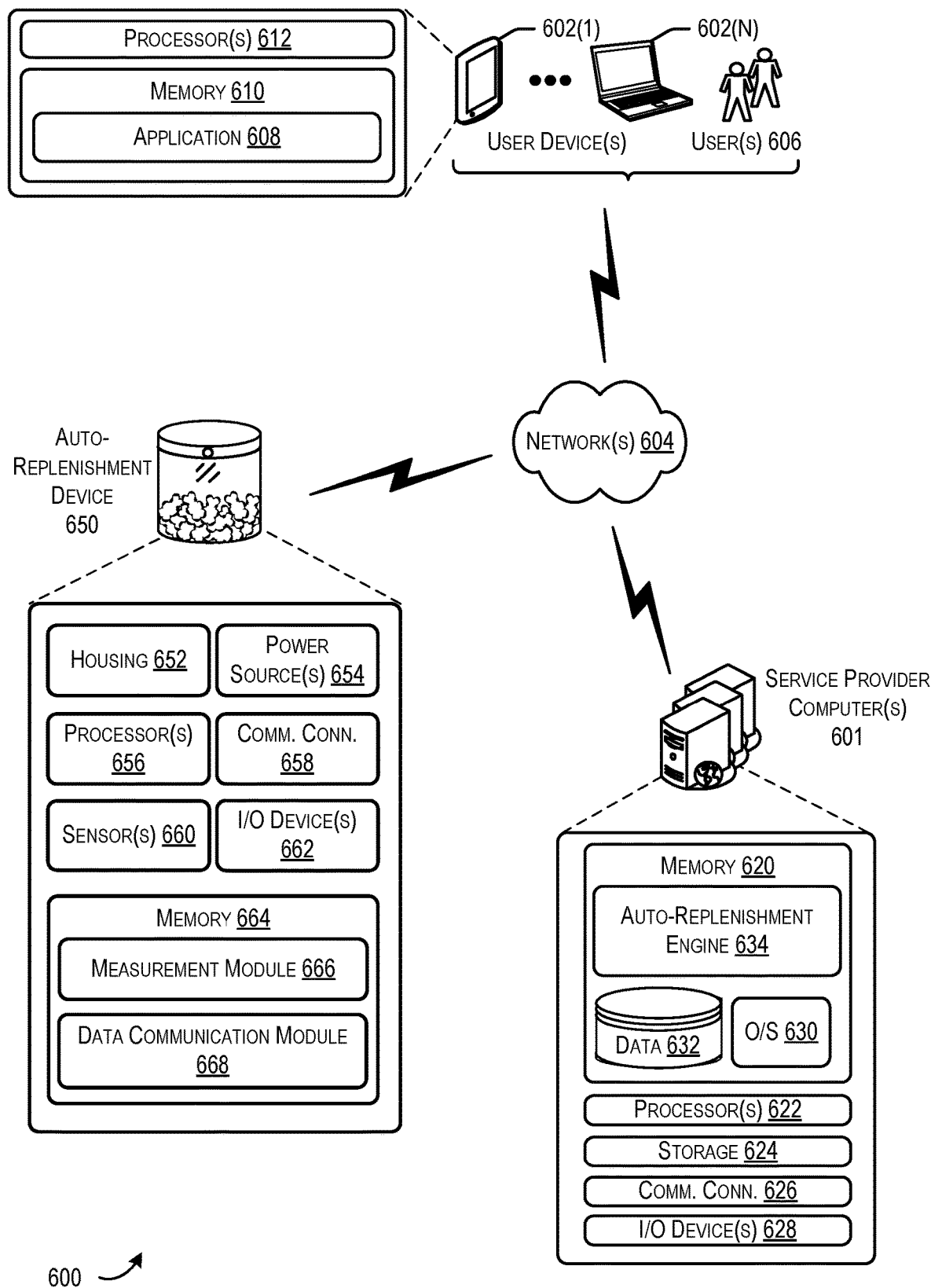
FIG. 6 illustrates an example computer network architecture for selecting a delivery method based on sensor data of an ARD, in accordance with at least one embodiment.

FIG. 6 illustrates an example computer network architecture for selecting a delivery method based on sensor data of an ARD, in accordance with at least one embodiment. As illustrated, the computer network architecture 600 may include one or more service provider computers 601 (e.g., the service provider computer(s) 110 of FIG. 1), one or more user devices 602 (e.g., the user device 114 of FIG. 1), and/or an ARD 650 (e.g., the ARD 102 of FIG. 1) connected via one or more networks 604. One or more users 606 (e.g., customers, users, consumers, etc.) may utilize user computing devices 602(1)-(N) (collectively, the user devices 602) to access application 608 (e.g., a browser application, a shopping application, etc.) or a user interface (UI) accessible through the application 608. In embodiments, the user devices 602 may include one or more components for enabling the user(s) 606 to interact with the application 608.

The user devices 602 may include at least one memory 610 and one or more processing units or processor(s) 612. The memory 610 may store program instructions that are loadable and executable on the processor(s) 612, as well as data generated during the execution of these programs. Depending on the configuration and type of the user devices 602, the memory 610 may be volatile (such as random access memory (RAM)) and/or non-volatile (such as read-only memory (ROM), flash memory, etc.). The user devices 602 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 602. In some implementations, the memory 610 may include multiple different types of memory, such as static random access memory (SRAM), dynamic random access memory (DRAM), or ROM.

Turning to the contents of the memory 610 in more detail, the memory 610 may include an operating system and one or more application programs or services for implementing the features disclosed herein. Additionally, the memory 610 may include one or more modules for implementing the features described herein including the automatic replenishment module.

The architecture 600 may also include one or more service provider computers 601 that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 601 may implement or be an example of the service provider computer(s) described herein. The one or more service provider computers 601 may also be operable to provide site hosting, media streaming services, computer application development, and/or implementation platforms, combinations of the foregoing, or the like to the one or more users 606 via user devices 602.

In some examples, the networks 604 may include any one or a combination of many different types of networks, such as cable networks, the Internet, wireless networks, cellular networks, and other private and/or public networks. While the illustrated examples represent the users 606 communicating with the service provider computers 601 over the networks 604, the described techniques may equally apply in instances where the users 606 interact with the one or more service provider computers 601 via the one or more user devices 602 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 601 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 601 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 601 may be in communication with the user devices 602 and/or the ARD 650 via the networks 604, or via other network connections. The one or more service provider computers 601 may include one or more servers, perhaps arranged in a cluster or as individual servers not associated with one another.

In one illustrative configuration, the one or more service provider computers 601 may include at least one memory 620 and one or more processing units or processor(s) 622. The processor(s) 622 may be implemented as appropriate in hardware, computer-executable instructions, firmware, or combination thereof. Computer-executable instruction or firmware implementations of the processor(s) 622 may include computer-executable or machine-executable instructions written in any suitable programming language to perform the various functions described when executed by a hardware computing device, such as a processor. The memory 620 may store program instructions that are loadable and executable on the processor(s) 622, as well as data generated during the execution of these programs. Depending on the configuration and type of the one or more service provider computers 601, the memory 620 may be volatile (such as RAM) and/or non-volatile (such as ROM, flash memory, etc.). The one or more service provider computers 601 or servers may also include additional storage 624, which may include removable storage and/or non-removable storage. The additional storage 624 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 620 may include multiple different types of memory, such as SRAM, DRAM, or ROM.

The memory 620, the additional storage 624, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 620 and the additional storage 624 are all examples of non-transitory computer storage media. Additional types of non-transitory computer storage media that may be present in the one or more service provider computers 601 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 601. Combinations of any of the above should also be included within the scope of non-transitory computer-readable media.

The one or more service provider computers 601 may also contain communication connection interface(s) 626 that allow the one or more service provider computers 601 to communicate with a data store, another computing device or server, user terminals, and/or other devices on the networks 604. The one or more service provider computers 601 may also include I/O device(s) 628, such as a keyboard, a mouse, a pen, a voice input device, a touch input device, a display, speakers, a printer, etc.

Turning to the contents of the memory 620 in more detail, the memory 620 may include an operating system 630, one or more data stores 632, and/or one or more application programs or services for implementing the features disclosed herein including the automatic replenishment engine 634. In accordance with at least one embodiment, the automatic replenishment engine 634 may be configured to maintain a user profile associated with a user, determine a current amount of an item stored by the ARD 650, determine a consumption rate of the item, determine whether to additionally order a second item for delivery with a first item, determining a replacement amount of an item stored with the ARD, or the like.

The architecture 600 also includes the ARD 650. As disclosed herein, the ARD 650 may be configured, among other things, to utilize sensor(s) 660 to obtain sensor data associated with items situated within or on the ARD 650 (e.g., in a container or on a surface of the ARD 650 as described in connection with FIGS. 4 and 5).

The ARD 650 (or a portion of the ARD 650 such as the ARD lid 402 of FIG. 4) may include a housing 652 that may include components of ARD 650 discussed further below. In embodiments, the housing 652 may be composed of any type of material (e.g., plastic, metal, etc.), and may serve to prevent the components of the ARD 650 from being damaged or interacting or otherwise contaminating the items placed within ARD 650.

The ARD 650 may include one or more power source(s) 654 that provide power to one or more components of the ARD 650. The power source(s) 654 may include a battery, which may include a one-time use battery or a rechargeable battery. However, the power source(s) 654 may rely on power from another source providing alternating current (AC) power and may be a power inverter. For example, the ARD may be powered via a power cord that is coupled to the ARD 650 and that is detachably connected to a power outlet, such as a wall outlet. In some embodiments, the ARD 650 may include a power level detector that is configured to determine and display a power level for the ARD 650 using alpha-numeric characters that indicate a current power level of a battery of the ARD 650 and power source(s) 654. The power level may be transmitted by the ARD 650 to a remote computing device (e.g., the service provider computer(s) 110 of FIG. 1), which may track the power level of the power source(s) 654 over time. In some embodiments, the ARD 650 and/or the remote computing device may provide a notification (e.g., to a client device not pictured) of the power level via any suitable means such an e-mail message, a text message, a mobile application, a website, etc.

The ARD 650 may include at least one memory (e.g., memory 664) and one or more processing units (e.g., processor(s) 656). The processor(s) 656 may be implemented as appropriate in hardware. Computer-executable instructions, software or firmware implementations of the processor(s) 656 may include computer-executable or machine-executable instructions written in any suitable programming language to perform the various functions described.

The memory 664 may include more than one memory and may be distributed throughout the ARD 650. The memory 664 may store program instructions (e.g., related to a measurement module 666 and/or a data communication module 668) that are loadable and executable on the processor(s) 656, as well as data generated during the execution of these programs. Depending on the configuration and type of memory, the memory 664 may be volatile (such as random access memory (RAM)) and/or non-volatile (such as read-only memory (ROM), flash memory, or other memory). In some implementations, the memory 664 may include multiple different types of memory, such as static random access memory (SRAM), dynamic random access memory (DRAM), or ROM.

Turning to the contents of the memory 664 in more detail, the memory 664 may include one or more application programs, modules or services for implementing the features disclosed herein including measurement module 666 and/or the data communication module 668. The measurement module 666 may include instructions that, when executed by the processor(s) 656 may cause sensor(s) 660 of the ARD 650 to capture sensor data including distance measurements and/or weight measurements associated with the items placed on, or within, the ARD 650. A distance measurement may quantify a distance between the sensor(s) 660 and the item on/within the ARD 650. The memory 664 may be configured to store the collected sensor data. In some embodiments, the measurement module 666 may be configured to convert raw sensor data into any suitable format and/or unit. The measurement module 666 may be configured to provide sensor data and/or converted sensor data to the data communications module 668.

In some embodiments, the data communication module 668 may include instructions that, when executed by the processor(s) 656, transmit and receive data via communication connection(s) 658. The communication connection(s) 658 may include suitable communication interfaces for communicating via Bluetooth (Bluetooth Low Energy (BLE)), Wi-Fi, a cellular connection (e.g., 3G, 4G, LTE, etc.). The communication connection(s) 658 may be configured to transmit the data to a remote computing device (e.g., the service provider computer(s) 601) or relay data to the remote computing device using a proxy device (e.g., a smartphone, a laptop, a desktop computer, or any suitable device capable of performing data transfers with the remote computing device). The communication connection(s) 658 any may utilize known or widely used communication protocols such as a wireless connection (Wi-Fi network), a wired connection to a network, cellular network, short-range or near-field networks (e.g., Bluetooth), infrared signals, local area networks, wide area networks, the Internet, etc.

In at least one embodiment, the data communication module 668 may be configured to obtain sensor data from the measurement module 666 and/or the memory 664. The data communication module 668 may be responsible for transmitting such sensor data to a remote computing device (e.g., the service provider computer(s) 110) according to any suitable communications protocol. The sensor data may be communicated in any manner, such as via Bluetooth (Bluetooth Low Energy (BLE) may also be considered when using the term "Bluetooth"), Wi-Fi, a cellular connection (e.g., 3G, 4G, LTE, etc.), and so on.

In at least one embodiment, the data communication module 668 may be configured to receive data via the communication connection(s) 658. For example, the data communication module 668 may be configured to receive item information (e.g., an item identifier, unit weight, material consistency, or any suitable attribute of an item) indicating an item that is placed on or within the ARD 650. In some embodiments, the item information or other suitable information communicated to the data communication module 668 may include/indicate conversion algorithms for converting raw sensor data into a particular format and/or unit. In still further embodiments, the data communication module 668 may be configured to receive any suitable information for instructing the measurement module 666 in a manner of collecting sensor data utilizing sensor(s) 660. By way of example, an instruction may be received by the data communication module 668 and communicated to the measurement module 666 that indicates that sensor data is to be collected according to a provided schedule, at a particular periodic rate, or the like. Generally, any suitable data that is to be transmitted or received by the ARD 650 may be processed by the data communication module 668 and provided to any other module and/or component of the ARD 650.

The ARD 650 may include sensor(s) 660 such as a time of flight sensor, or other suitable sensors such as time of flight camera sensors, scale sensors, or infrared sensors that are configured to obtain or capture sensor data of items placed on and/or within the ARD 650. The time of flight sensors may include signal transmitters and receivers that are configured to determine an amount, quantity, and/or volume of an item stored on and/or within the ARD 650 or calculate a distance from the source of the signal to the receptor of the signal which can be converted into an amount of the item stored on and/or within the ARD 650.

The sensor(s) 660 may be configured to periodically obtain sensor data regarding the items placed on or within the ARD 650 at predetermined intervals, such as every day, every twelve hours, every six hours, every hour, every fifteen minutes, and so on. In some embodiments, the sensor(s) 660 may determine/sense when an item is placed on or within the ARD 650, which may cause the sensor(s) 660 to obtain sensor data associated with the item(s). The sensor(s) 660 may also be instructed (e.g., by the measurement module 666) to obtain sensor data via instructions initiated at a remote computing device (e.g., the service provider computer(s) 110). The frequency of sensor data collection performed by the sensor(s) 660 may be adjusted over time, which may be based on the rate of consumption of the items and/or the manner in which the ARD 650 is being powered. For instance, if the ARD 650 is being powered via a power cord and power outlet, the sensor data may be obtained more frequently (e.g., every hour, every fifteen minutes, etc.). However, if the ARD 650 is being powered using a battery, the sensor data may be collected less frequently to conserve battery life.

The ARD 650 may also include input/output (I/O) device(s) 662 and/or ports, such as for enabling connection with a keyboard, a mouse, a pen, a voice input device, a touch input device, a display, speakers, a printer, or other I/O device. The I/O device(s) 662 may be in any suitable form to enable data to be provided to any suitable component of the ARD 650 and/or for presenting information (e.g., text, lights, sounds) at the ARD 650 (e.g., via speaker, a display, haptic feedback, etc.).

Figure 7:
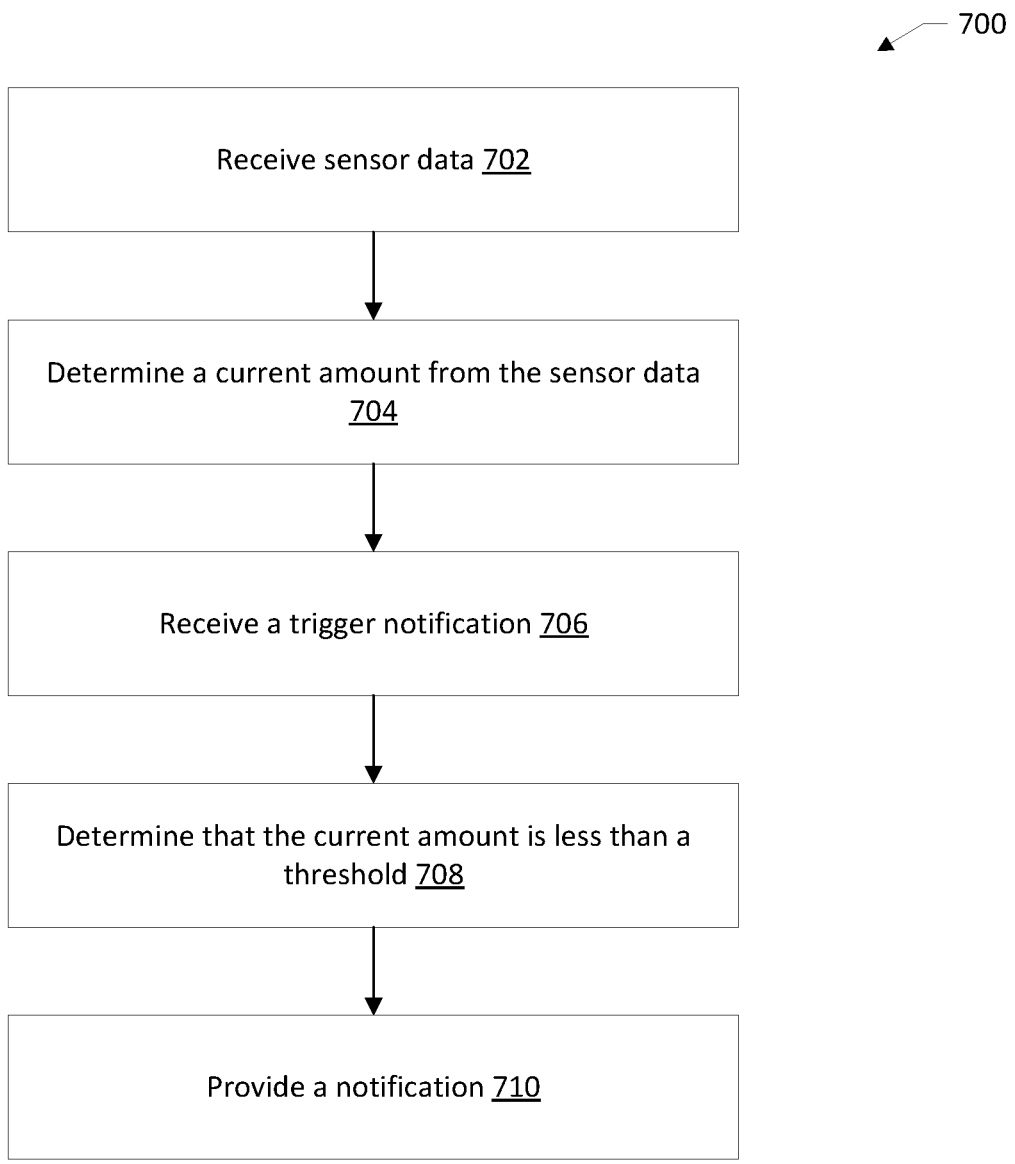
FIG. 7 illustrates a flow diagram of a process for predictive consolidation of items based on sensor data, in accordance with at least one embodiment.

FIG. 7 illustrates a flow diagram of a process for predictive consolidation of items based on sensor data, in accordance with at least one embodiment. In some examples, the one or more service provider computers 601 (e.g., the service provider computer(s) 110 of FIG. 1), (e.g., utilizing the auto-replenishment engine 634, etc.) or one or more user devices 602 shown in FIG. 6 may perform the process 700 of FIG. 7.

Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 700 may begin at 702 by receiving sensor data. For example, a service provider computer may receive the sensor data from an automatic replenishment device (ARD). The sensor data may indicate a current amount of a first item stored by the ARD. In some examples, the sensor data may be received at predetermined intervals or in response to a request for sensor data between the service provider computer and the ARD.

At 704, a current amount may be determined. For example, the service provider computer may determine the current amount of the first item stored by the ARD from the sensor data. In some examples, the service provider computer may determine that a replacement amount of the first item should not be reordered on behalf of the ARD. This may correspond with the determination that the current amount is not below a first reorder threshold, thus exceeding the first reorder threshold.

At 706, a trigger notification may be received. For example, the service provider computer may receive a trigger notification of an order of the second item. The order of the second item may correspond with a user device accessing a network document and electronically placing the second item in an electronic shopping cart. In other examples, the order of the second item may correspond with an automatic reorder process also associated with the user device. At least one of these actions may initiate the trigger notification received by the service provider computer.

At 708, a current amount may be determined. For example, the service provider computer may determine that the current amount is less than a second threshold, but not the first threshold. This determination may be initiated based at least in part on receiving the trigger notification.

At 710, a notification may be provided. For example, the service provider computer may provide a notification to a user device. The notification may be based on a current amount of the item being less than the second threshold and receiving the order of the second item. The notification may correspond with additionally ordering the replacement amount of the first item for delivery with the second item.

Figure 8:
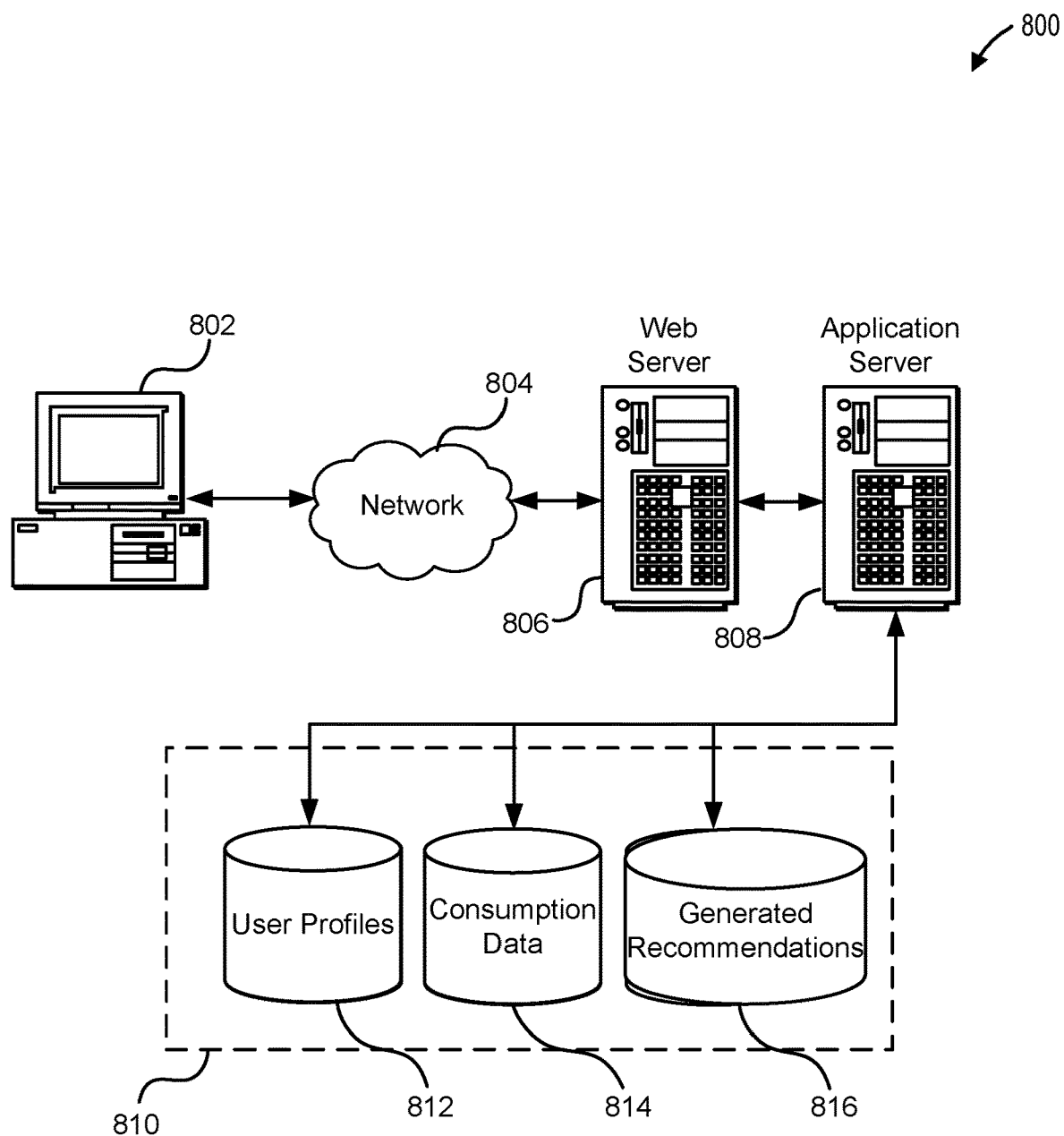
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing user profiles and associated information 812 as well as generated recommendations 816, which can be used to serve content for the production side, compare user characteristics included in the user profiles to generate recommendations for similar users, generate recommendations to update a quantity or amount of an item that is automatically reordered based on consumption date, or generate recommendations for items for users that do not utilize an ARD based on consumption data from a similar user that does utilize an ARD. The data store also is shown to include a mechanism for storing consumption data 814, which can be used for reporting, analysis, or other such purposes such as identifying a consumption rate or use of an item based on sensor data obtained by an ARD and communicated to the servers 806 and/or 808. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
 a memory configured to store computer-executable instructions; and
 a processor in communication with the memory configured to execute the computer-executable instructions to at least:
  receive sensor data from an automatic replenishment device (ARD), the sensor data indicating a current amount of a first item stored in a storage associated with the ARD;
  determine the current amount based at least in part on the sensor data;
  determine that a replacement amount of the first item should not be reordered on behalf of the ARD, based at least in part on the current amount exceeding a first threshold;
  receive a trigger notification of an order of a second item, the order being associated with a user profile, and the trigger notification initiating a comparison between the current amount of the first item and a second threshold;
  determine, based at least in part on the trigger notification, that the current amount of the first item is less than the second threshold; and
  based at least in part on the current amount of the first item being less than the second threshold and the order for the second item, provide a notification to a user device associated with the user profile for additionally ordering the replacement amount of the first item for delivery with the second item.

2. The system of claim 1, wherein the sensor data is received at predetermined intervals.

3. The system of claim 1, wherein the trigger notification is associated with the user device accessing a network document associated with the system.

4. The system of claim 1, wherein the trigger notification is associated with an automatic order of the first item at a periodic interval.

5. The system of claim 1, the computer-executable instructions further configured to:
 store the current amount of the first item with the user profile, the user profile identifying the ARD, and the order of the second item being associated with the user profile.

6. The system of claim 1, wherein the order of the second item associated with the trigger notification is based on a reorder schedule for the second item and the second threshold is associated with the first item.

7. The system of claim 1, wherein the computer-executable instructions, upon execution, further cause the system to:
 initiate shipping of the first item that has exceeded the first threshold and is less than the second threshold; and
 initiate shipping of the second item.

8. A non-transitory computer-readable storage medium storing computer-executable instructions that, when executed by a computer system, configure the computer system to perform operations comprising:
 receiving sensor data from an automatic replenishment device (ARD), the sensor data indicating a current amount of a first item available from storage associated with the ARD;
 determining the current amount based at least in part on the sensor data;
 determining that a replacement amount of the first item should not be reordered on behalf of the ARD, based at least in part on the current amount exceeding a first threshold;
 receiving a trigger notification of an order of a second item, the trigger notification initiating a comparison between the current amount of the first item and a second threshold;
 determining, based at least in part on the trigger notification, that the current amount of the first item is less than the second threshold; and
 based at least in part on the current amount of the first item being less than the second threshold and the order for the second item, providing a notification for additionally ordering the replacement amount of the first item for delivery with the second item.

9. The non-transitory computer-readable storage medium of claim 8, wherein an indication of the current amount is stored with a user profile, and the operations further comprise:
 instructing delivery of the first item and the second item to a location associated with the user profile.

10. The non-transitory computer-readable storage medium of claim 8, wherein the notification comprises a shipment offer based at least in part on the sensor data.

11. The non-transitory computer-readable storage medium of claim 8, wherein the notification comprises a shipment offer when the first item and the second item are shipped together.

12. The non-transitory computer-readable storage medium of claim 8, wherein the notification comprises a link to accept a single shipment that includes the first item and the second item.

13. The non-transitory computer-readable storage medium of claim 8, wherein the notification comprises an option to decline the first item.

14. The non-transitory computer-readable storage medium of claim 8, wherein the second threshold is a predetermined amount above the first threshold.

15. The non-transitory computer-readable storage medium of claim 8, wherein operations further comprise generating instructions that cause placing the first item and the second item in a single package.

16. A computer-implemented method comprising:
 receiving sensor data from an automatic replenishment device (ARD), the sensor data indicating a current amount of a first item stored in a storage associated with the ARD;
 determining the current amount based at least in part on the sensor data;
 determining that a replacement amount of the first item should not be reordered on behalf of the ARD, based at least in part on the current amount exceeding a first threshold;
 receiving a trigger notification of an order of a second item, the trigger notification initiating a comparison between the current amount of the first item and a second threshold;
 determining, based at least in part on the trigger notification, that the current amount of the first item is less than the second threshold; and
 based at least in part on the current amount of the first item being less than the second threshold and the order for the second item, providing a notification for additionally ordering the replacement amount of the first item for delivery with the second item.

17. The computer-implemented method of claim 16, further comprising:
- determining a consumption rate of a third item based at least in part on second sensor data received from the ARD;
- determining, based at least in part on the consumption rate, that a corresponding amount of the third item is less than the second threshold; and
- updating the notification to include delivering the third item with the second item.

18. The computer-implemented method of claim 16, wherein the sensor data comprises an identifier of the ARD and raw data, wherein a user profile stores an association between the identifier of the ARD and the first item, and wherein the raw data comprises at least one or more of: weight data or optical data.

19. The computer-implemented method of claim 16, wherein the ARD comprises one or more antennas that are configured to transmit, via Wi-Fi, a device identifier and an item identifier associated with the first item.

20. The computer-implemented method of claim 16, wherein the sensor data is captured by a weight sensor that is configured to measure a weight of the first item.

21. The computer-implemented method of claim 16, wherein the sensor data is captured by a time of flight (TOF) sensor that is configured to measure a distance between the ARD and a surface of the first item in the storage of the ARD.

22. The computer-implemented method of claim 16, wherein the second threshold is a range of ten to twenty percent larger than the first threshold, and wherein the range is defined based at least in part on historical deliveries of replacement amounts of the first item with other items.

* * * * *

UNITED STATES PATENT AND TRADEMARK OFFICE
CERTIFICATE OF CORRECTION

| | | |
|---|---|---|
| PATENT NO. | : 11,100,464 B1 | Page 1 of 1 |
| APPLICATION NO. | : 16/530562 | |
| DATED | : August 24, 2021 | |
| INVENTOR(S) | : Dave Jonathan Lefkow et al. | |

It is certified that error appears in the above-identified patent and that said Letters Patent is hereby corrected as shown below:

On the Title Page

Item (72):
Please delete "Hannah McClellan Richards, Seattle, WA (US)" and add "Hannah McClellan Richards, Boise, ID (US)"

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*